(12) United States Patent
Schudt et al.

(10) Patent No.: US 6,273,122 B1
(45) Date of Patent: Aug. 14, 2001

(54) MAGNETIC VALVE, ESPECIALLY FOR USE IN A MODULE FOR AN ELECTROHYDRAULIC GEAR UNIT CONTROLLER

(75) Inventors: Klaus Schudt, Nordheim (DE); Jim Beakley, West Bloomfield Township; John Casari, Manchester, both of MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/395,241

(22) Filed: Sep. 13, 1999

(30) Foreign Application Priority Data

Sep. 16, 1998 (DE) .............................. 198 42 334

(51) Int. Cl.$^7$ .................................................. F16K 43/00
(52) U.S. Cl. .................. 137/315.03; 137/15.09; 137/265.65; 137/315.09; 137/596.17; 251/367
(58) Field of Search .................... 251/367; 137/884, 137/625.64, 625.65, 625.27, 596.17, 15.09, 15.17, 315.03, 315.09, 315.27

(56) References Cited

U.S. PATENT DOCUMENTS

| | | | |
|---|---|---|---|
| 4,756,331 | * | 7/1988 | Stegmaier ........................ 137/271 |
| 4,785,848 | * | 11/1988 | Leiber ........................... 137/596.17 |
| 5,282,329 | * | 2/1994 | Teranishi ........................ 137/596.17 |
| 5,335,983 | * | 8/1994 | Beck et al. ..................... 137/596.17 |
| 5,449,019 | * | 9/1995 | Hara ............................. 137/596.17 |
| 5,651,387 | * | 7/1997 | Thor ............................... 137/454.2 |
| 5,735,503 | * | 4/1998 | Hietkamp ......................... 251/30.01 |

FOREIGN PATENT DOCUMENTS 35 03 785 A1   8/1986  (DE) .

* cited by examiner

*Primary Examiner*—Kevin Shaver
*Assistant Examiner*—D A Bonderer
(74) *Attorney, Agent, or Firm*—Michael J. Striker

(57) ABSTRACT

The magnetic valve (16,17) is arrangeable in a multipart housing (12) and includes a coil-part group (64,128) and a valve subassembly (138). The valve subassembly (138) is arrangeable in a valve seat (94,95) provided in a housing (12). The valve subassembly (138) includes a punched seat disk (170) and a punched and deep-drawn valve cap (152), which extend into the valve seat (94,95). A pin insert (214,224) is provided between the valve cap (152) and the seat disk (170). The pin insert (214,224) is connected with one end of a longitudinally slidable pin (202) attached to an armature (194). The magnetic valve can be operated to alternately connect a consumer connection (A) with an inlet connection (P) or a return connection (T). A module (10) including a pair or pairs of these magnetic valves (16,17) is also disclosed. Each pair of valves can includes one valve that is open and another valve that is closed when current flows through their coils.

14 Claims, 6 Drawing Sheets

MAGNETIC VALVE, ESPECIALLY FOR USE IN A MODULE FOR AN ELECTROHYDRAULIC GEAR UNIT CONTROLLER

BACKGROUND OF THE INVENTION

1. Field of the Invention

The preset invention relates to a magnetic valve and, more particularly, to a magnetic valve for a module for an electrohydraulic gear unit controller, which can be arranged in a multipart housing and which comprises a valve subassembly and a coil-part group.

2. Prior Art

This kind of magnetic valve has already been used in a module for an electrohydraulic gear unit controller. It includes an expensive valve subassembly group, which comprises many expensive parts, which must be made by turning, drilling and cutting or milling. The displacement of the magnetic valve must be adjusted during assembly in an expensive manner. The sealing of the magnetic valve and the valve subassembly group occurs by means of several O-rings, which are parts that exhibit wear. The coil-part group is often attached to the valve subassembly group with attaching means, such as screws and attaching straps or clips. The attachment of the magnetic valve in the control block occurs by means of an additional strap, which is attached with screws to the control block.

A conventional magnetic valve, as a whole, requires many different parts and many working steps for its manufacture and assembly.

SUMMARY OF THE INVENTION

It is an object of the present invention to provide a magnetic valve of the above-described kind, especially for use in a module for an electrohydraulic gear unit controller, which does not have the above-described disadvantages.

This object and others which will be made more apparent hereinafter is attained in a magnetic valve, especially for use in a module of an electrohydraulic gear unit controller, which is arranged in a multipart housing and which comprises a valve-part group and a coil-part group.

According to the invention the valve subassembly is arranged in a valve seat formed in one housing part and the valve subassembly has a punched and deep-drawn valve cap that extends into the valve seat, a punched or stamped seat disk, and a pin insert arranged between the seat disk and the valve cap in such a way that a consumer connection is alternately connectable with an inlet connection or an return connection of the magnetic valve by means of the seat disk, the valve cap and the pin insert.

The magnetic valve according to the invention has the advantage that the valve subassembly is simple to construct and thus economical to manufacture. The displacement of the magnetic valve can advantageously be adjusted prior to its assembly. Only one O-ring is required for sealing it. The valve subassembly is shaped to fit in one housing part and the coil-part group is shaped to fit in the other housing part.

Further advantages and advantageous features are described in the detailed description and the dependent claims appended below.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENT

Figure 1:
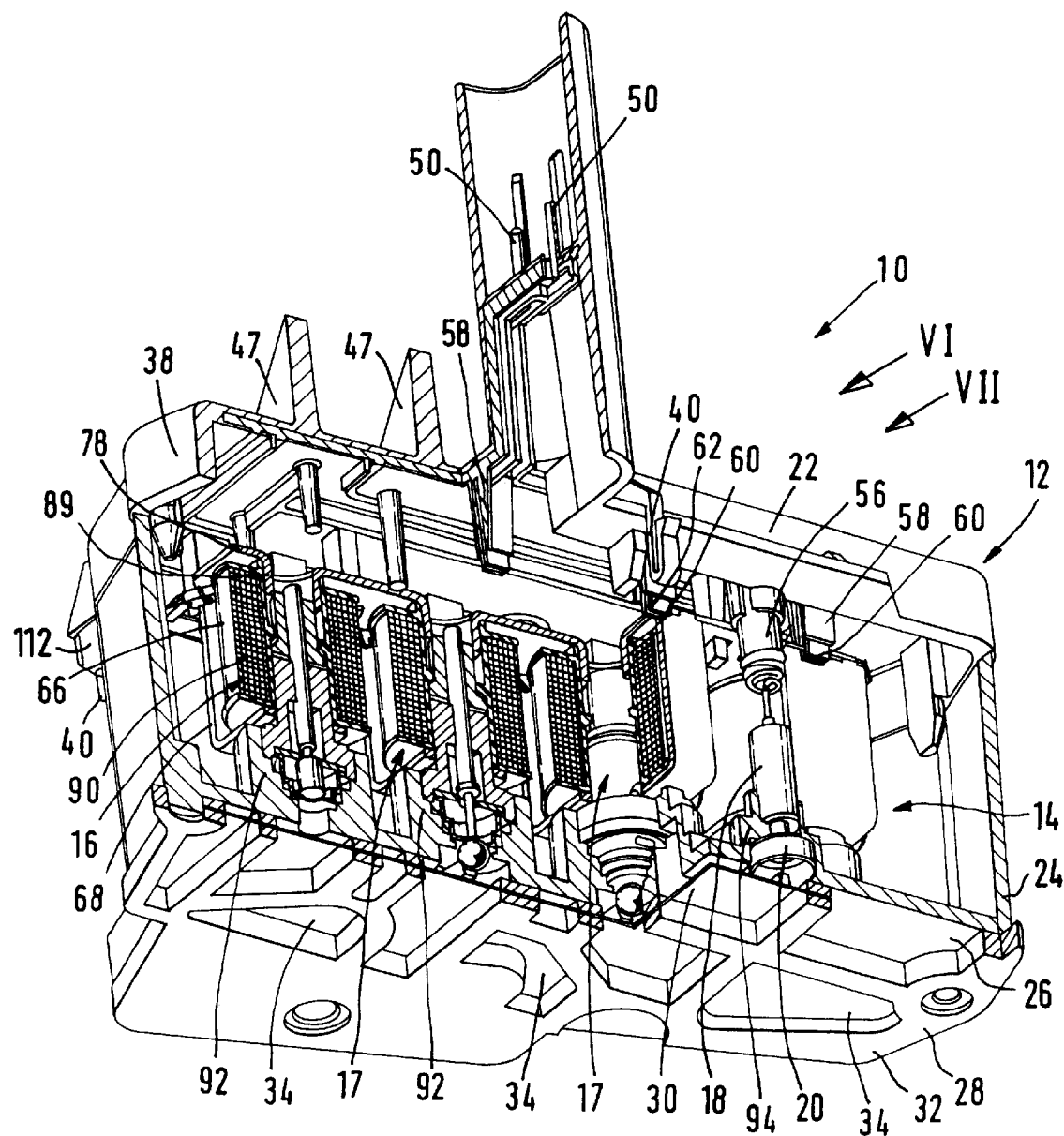
FIG. 1 is a cutaway perspective view of a module containing an electromagnetic valve according to the invention.

A module 10 is shown in FIG. 1, especially for an electrohydraulic gear unit controller. The module 10 has a multipart housing 12, in which a part group 14 is located. Two first magnetic valves 16, which are each open when no current is supplied to them, and two second magnetic valves 17, which are each closed when no current is supplied to them, are part of this part group 14. These valves are especially designed for use in a module 10 for an electrohydraulic gear unit controller and are 3/2-way valves. Three resistors 18 and two switches 20 are also part of the part group 14, but more or fewer resistors and switches may be included in other embodiments. The housing 12 comprises at least two housing parts, at least a first housing part formed as a control block 24 and at least a second housing part formed as a control block 24.

A filter plate 28 is attached to a mounting plate 26 of the control block 24. The filter plate 28 comprises a filter mesh 30 over which a distributor plate 32 that has a plurality of throughgoing passages 34 is arranged. The throughgoing passages 34 are connected with passages or holes in the control block 24 and thus permit connection of different lines to the magnetic valves 16,17.

The filter plate 28 is made in a so-called thixotropic material process or Thixomolding® method. In that process processing of metallic materials, especially magnesium, is indicated in a die-casting machine. In addition an alloy granulate is heated in a controlled manner in a rotating screw conveyor so that a plastic mass comprising a thixotropic mass of solid and liquid phases is formed. The metal that is plasticized in this way is extruded into the molds within milliseconds under high pressure. The advantage of this casting method in comparison to existing commercial casting methods is that no subsequent working of the seat surfaces is required, since the surface quality is very good. For this reason no additional seals are required in the filter plate 28. Thus the thioxotropic casting method is very advantageous for manufacture of the filter plate 28 for the module 10. Alternatively the filter plate 28 of course can be a filter mesh 30 which is extruded from plastic. In that case seals made of silicone or rubber can also be provided.

Figure 2A:
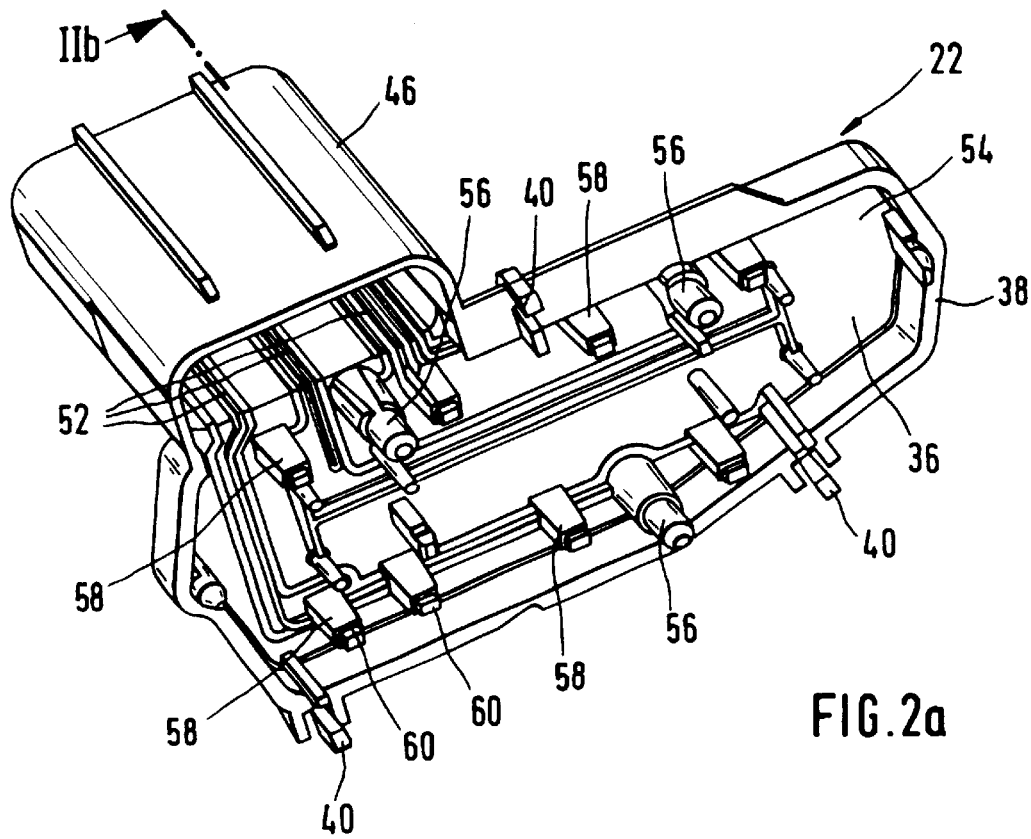
FIG. 2a is a perspective view of a cover of the apparatus shown in FIG. 1.
Figure 2B:
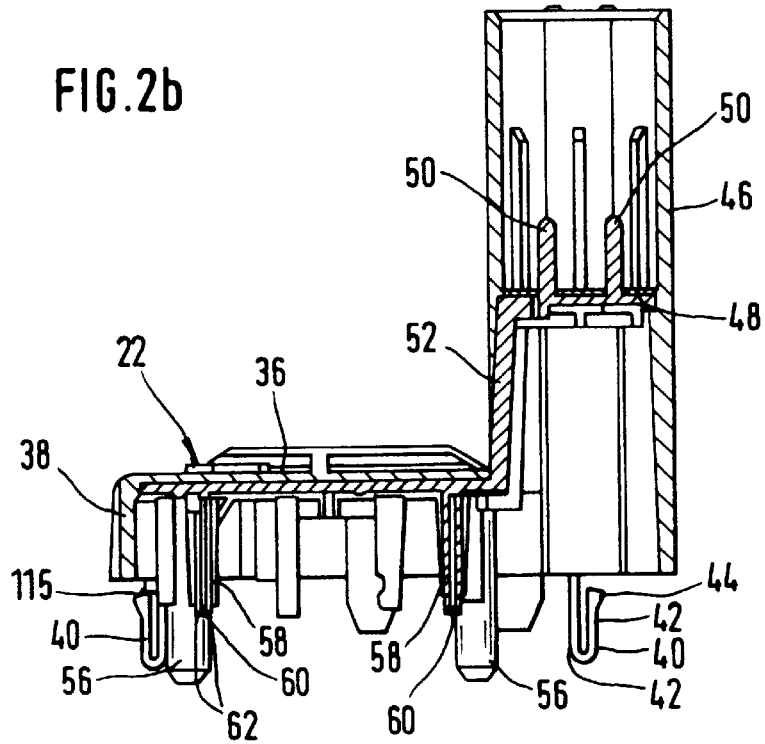
FIG. 2b is a cross-sectional view through the cover shown in FIG. 2a taken along the section line IIb.

The cover 22 of the housing 12 is shown in FIGS. 2a and 2b. The cover 22 has a plate-like part 36 with a peripheral edge from which a wall 38 extends in the direction of the control block 24. Three locking clips 40 are formed on the wall 38 of the cover 22. Each locking clip 40 comprises two clip halves 42 that are parallel to each other and to the wall 38. A first clip half 42 is formed with one end at the wall 38. The other end is connected by a 180° bend with the second clip halve 42. The end of the second clip halve 42 has an enlarged portion 44 so that a secure connection of the cover 22 to the control block 24 is possible.

A pipe-like socket member 46 is cast on a lateral edge of the cover 22 and is perpendicular to the plate-like cover piece 36. The one end of the socket member is connected flush with the wall 38. The other end projects beyond the plate-like cover piece 36. Two ribs 47 (FIG. 1) are formed between the plate-like cover piece 36 and the socket member 46 for mechanical reinforcement. A plate-like insert piece 48 arranged approximately parallel to the plate-like cover piece 36 is provided in the socket member 46. Socket contacts 50 pointing away from the housing 12 are formed on the plate-like insert piece 48. Conductor strips 52 extend from the respective socket contacts 50 along the plate-like insert piece 48, also at right angles thereto along the interior side of the socket member 46 and then again along the inner side 54 of the plate-like cover piece 36 of the cover 22. The conductor strips 52 are preferably three-dimensional structures on the cover 22, so that the cover 22 has a complex structure. The interior side 54 of the cover piece 36 means that side which is inside when the cover 22 is assembled together with the housing 12.

Individual conductor strips 52 extend on the interior side 54 to respective tapering or conical protruding elements 56. The conical protruding elements 56 of the cover 22 act to fix and contact respective resistors 18. The conical protruding elements 56 are provided with a metallic coating that is connected with the conductor strips 52. Conductor strips 52 also connect to eight protruding elements 58 grouped in two parallel rows of four respective protruding elements. In one row the protruding elements 58 are equally spaced from each other while in the other row three protruding elements 58 are equally spaced from each other and a fourth protruding element 58 has a smaller spacing from the others. The ends 60 of the protruding elements 58 are formed so that a terminal cut connection with a wire is possible. At least two cuts 62 extending inclined with respect to each other are provided on the ends 60. The cuts 62 similarly are metallized and are connected to the conductor strips 52. The protruding elements 56,58 are devices for electrical connection and for mechanical attachment of the part group 14. The mechanical attachment is obtained by means of a form-fitting connection that requires no additional attaching devices or parts, such as screws and plugs. The cover 22 is, as shown in FIG. 1, formed so that the part group 14 can be arranged on the interior side 54, which means on one side of the cover 22. An economical uniaxial assembly is possible in this way.

The cover 22 (second housing part) is made in a so-called MID casting process. The MID (Molded Interconnect Devices) casting process means threedimensional injection cast conductor supports. Products are made from thermoplastics in this process, which are provided with partially or completely metallized surfaces. One of the most frequently employed manufacturing processes for MID is the two-component injection casting method with subsequent wet chemical metallization of plastic components. A connecting body is made from two thermoplastic parts, of which one is metallizable while the other components remains completely unaffected by the chemical action of the metallized electrolytes. MID broadens or extends the conventional circuit board engineering techniques which are limited to a plane. The great advantage of MID is the large degree of geometric freedom which permits, as already described, the three-dimensional structure of the conductor strips 52, the reduction in material costs and above all the reduced number of manufacturing steps, by which additional components, such as punched grids, are eliminated. Thus direct application in complex modules 10, such as controllers, is very advantageous.

Figure 3:
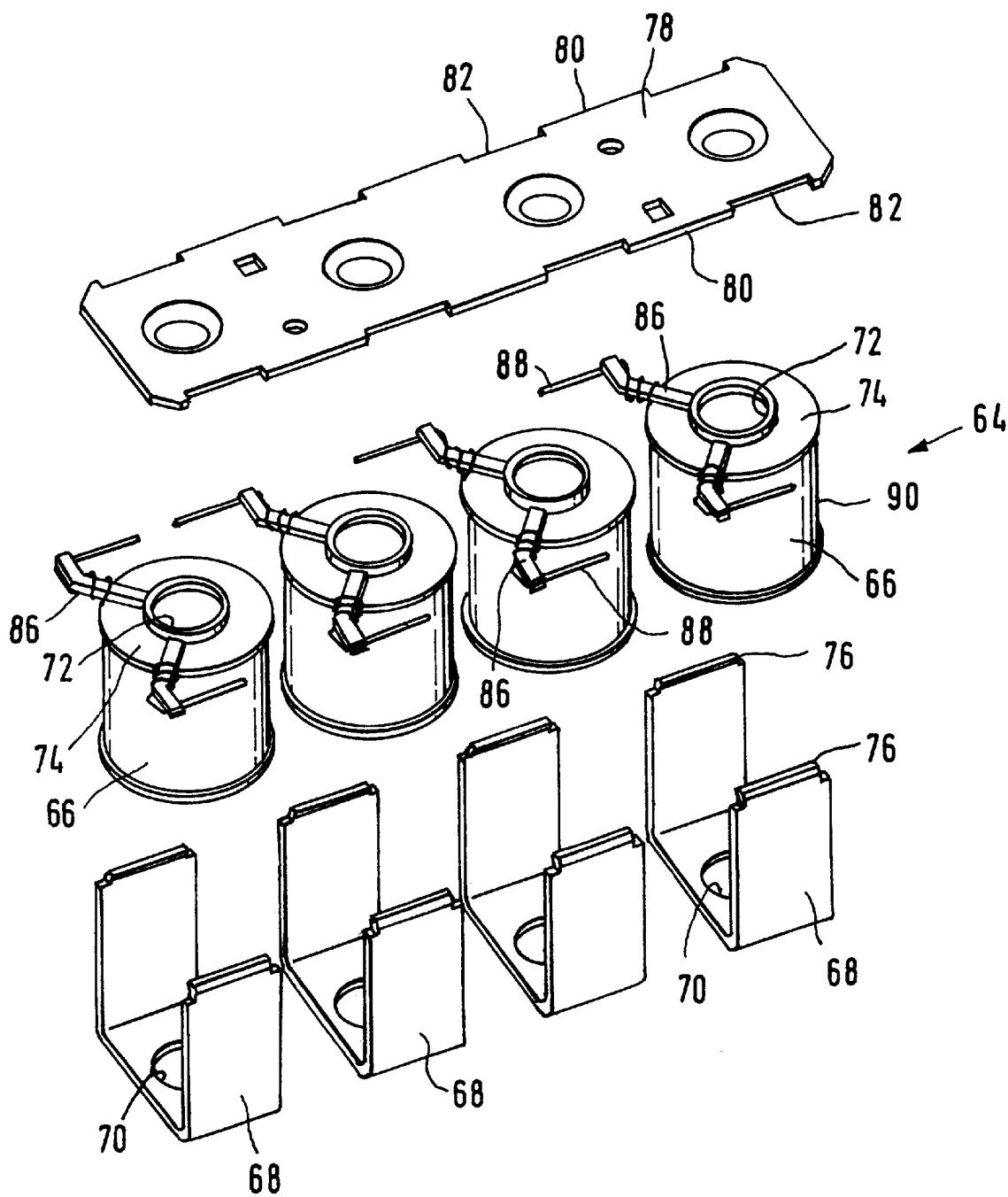
FIG. 3 is an exploded perspective view of a module-like coil-part group.

A coil-part group 64 of the gear unit magnetic valves 16, 17 in the form of a coil module is shown in an exploded perspective view in FIG. 3. The coil-part group 64 has four coils 66. Each of the four coils is arranged in a U-shaped flux bracket 68. A hole 70 is provided centrally in the crosspiece of each flux bracket 68 which is aligned with the passage 72 in the coil body 74 of the coil 66 engaged with it. The ends 76 of both U-members of the flux bracket 68 have the form of snap hooks and are bent so that they engage a flux plate 78 in a form- and force-locking manner, whereby the coils 66 are attachable to the flux plate 78. Instead of forming the ends 76 of the U-shaped flux bracket 68 preferably like snap hooks that engage around the flux plate 78, the flux bracket 68 can be welded or formed to fit together with the flux plate 78 in other ways in other embodiments. The flux plate 78 has a longitudinal extent and is substantially rectangular. In this way the coils 66 and the flux brackets 68 are arranged in a row on the flux plate 78. So that the flux brackets 68 are not longitudinal slidable on the flux plate 78, small recesses 82 are provided in the long sides of the flux plate 78, in which the ends 76 of the flux brackets 68 engage. Four recesses 82 are equally spaced from each other in each long side. As shown in FIG. 1, the flux plate 78 has four protruding ducts 89. The size of the ducts 89 is such that they engage with some play in the throughgoing holes 72 in the coil bodies 74 of respective coils 66. The coils 66 are fixed better in their appropriate position by means of the ducts 89 and provide additional iron in the coils 66, whereby the magnetic properties of the coils are improved.

Each coil 66 has two arms 86 which are V-shaped and arranged transversely to the throughgoing holes 72. The wire ends 88 of the windings 90 of the coils are placed on the respective arms 86. The arms 86 guarantee that the wire ends 88 are fixed in their positions. The wire ends 88 of the coils 66 are oriented so that two rows of aligned wire ends result. The wire ends in one row point in the same direction and are equally spaced from each other. In the other row three of the four wire ends are equally spaced from each other and point in the same direction. The fourth of the four wire ends 88 points in the opposite direction from the other three wires in the other row. The wire ends 88 are aligned like the protruding elements 58 of the cover 22 for assembly of the coil-part group 64. In this way it is guaranteed that the coil-part group 64 has the correct alignment in the cover 22. Thus the possibility of incorrect assembly of the coil-part group is eliminated. The coil-part group 64 is held on the cover 22 by means of the terminal cut connections, which are formed by the cuts 62 on the ends of the protruding elements 58 and the wire ends 88. Because of that a reliable mechanical and electrical connection of the coil-part group 64 with the cover 22 results. Preferably no additional contacting work is required, for example as would be performed by means of a solder bath. The assembly of the modular coil-part group 64 is very simple, since it is assembled as a single structural group.

Figure 4:
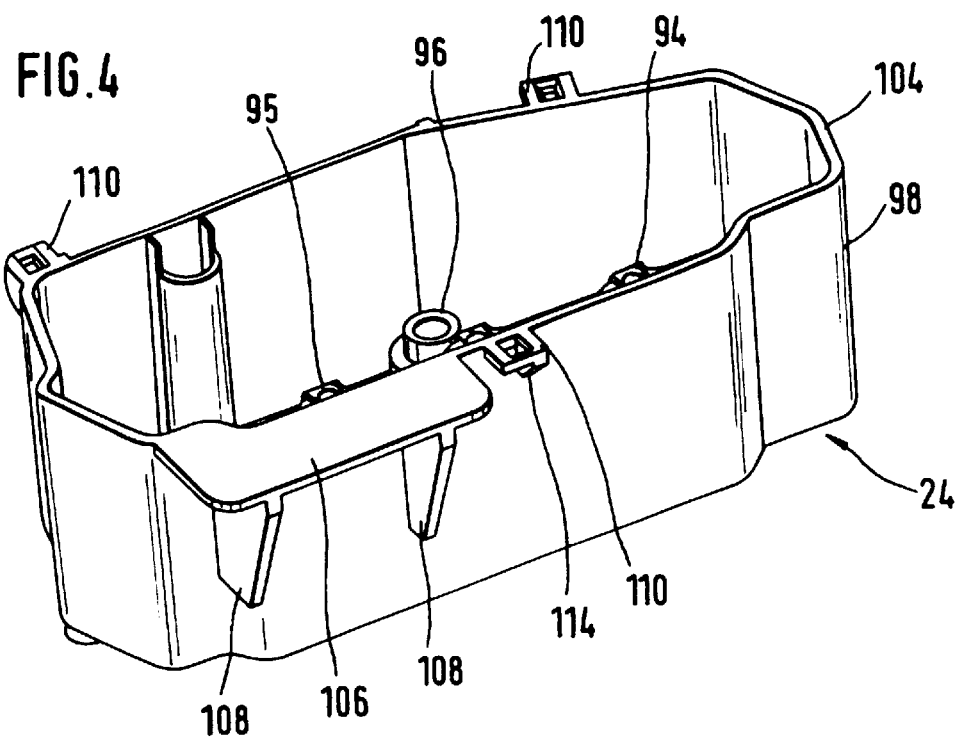
FIG. 4 is a perspective view of a control block.
Figure 5:
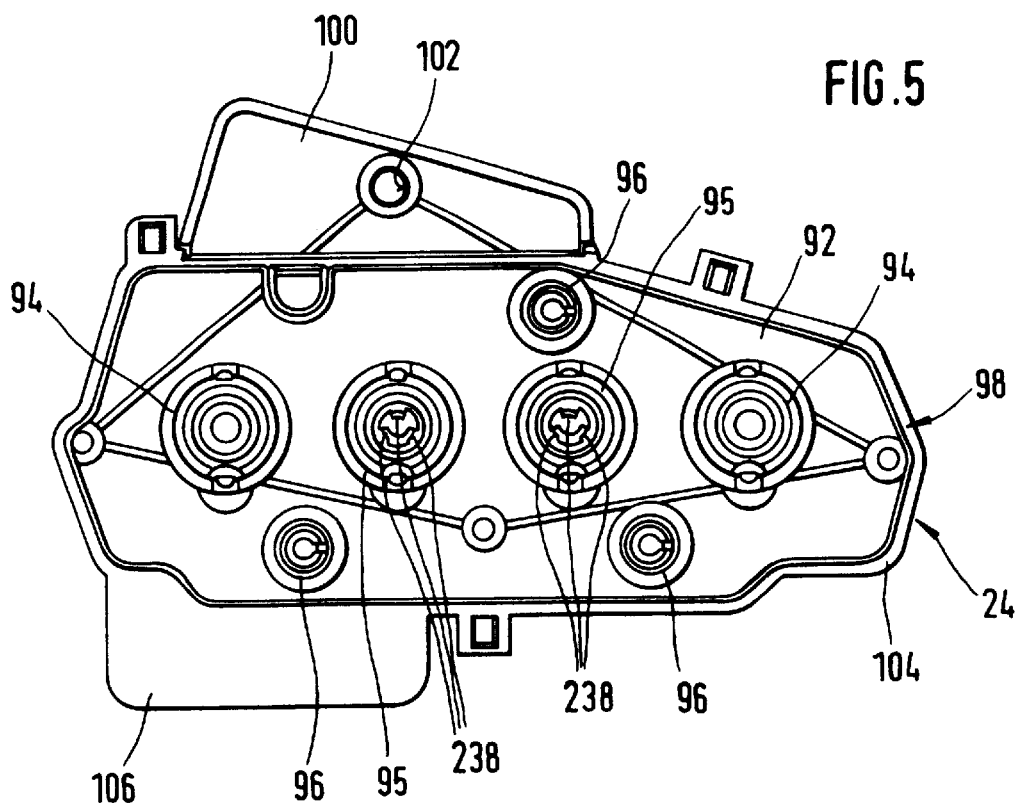
FIG. 5 is a plan view of the control block of FIG. 4.

A more detailed structure for the control block 24 is shown in FIGS. 4 and 5. The control block 24 has a control plate 92 on which the mounting surface 26 for the filter plate 28 is provided. Four receptacles are provided in a row in the control plate 92 in the form of valve seats 94,95 for the magnetic valves 16 and 17. Three receptacles 96 for the resistors 18 are arranged around the four valve seats 94,95. A wall 98 extends peripherally around the control plate 92. The wall 98 of the control block 24 has the same peripheral form as the wall 38 of the cover 22. Generally it is higher. A flange 100 with a passage 102 is formed outside the wall 98 at the same level as the control plate 92. A plate-like part 106 is formed on the upper edge 104 of the wall 98. Two ribs 108 are formed between the wall 98 and the plate-like part 106 for mechanical reinforcement. The plate-like part 106 closes the end of the socket member 46, which faces the control block 24.

Similarly three U-shaped receptacles 110 are formed on the edge 104 of the wall 98 outside of the control block 24. Cavities in the form of rectangular passages 112 are formed in the respective receptacles 110. A reinforcing rib 114 is provided for each receptacle 110 for mechanical reinforcement. The receptacles 110 with their passages 112 are arranged so that the cover 22 is guided with the locking clips 40 engaged in the passages 112 during assembly of the module 10. Both clip halves 42 are pressed together during the guiding of the locking clips through the passages 112 of the receptacles 110, when the enlarged portions are forced against the receptacles 110. When the cover 22 comes into contact with its wall 38 on the edge 104 of the wall 98 of the control block 24, also the enlarged portions 44 are guided into the receptacles 110. The clip halves 42 again spread out from each other because of their curved elastic connection. The cover 22 is attached reliably to the control block 24. The ends of the enlarged portions are inclined so that after guiding the locking clips 40 through the receptacles 110 respective inclined surfaces 115 of the enlarged portions bear on the receptacles 110. Thus the locking clips 40 exert a pressing force so that the cover 22 is pressed on the control block 2. Alternatively it is conceivable that the cover 22 and the control block 24 are connected with each other by a conventional screw connection in other embodiments.

A seal is provided between the cover 22 and the control block 24. The control block 24 is however similarly made in a thixotropic casting method. This casting method has, as already been described, the advantage that no subsequent working of the seat surfaces, such as the upper edge 104 of the wall 98 of the control block 24, is required. Thus on closing the control block 24 with the cover 22 no additional sealing is required. The surface material of the seating surfaces of the valve seat 94,95 is so good that they need not be further worked.

Figure 6:
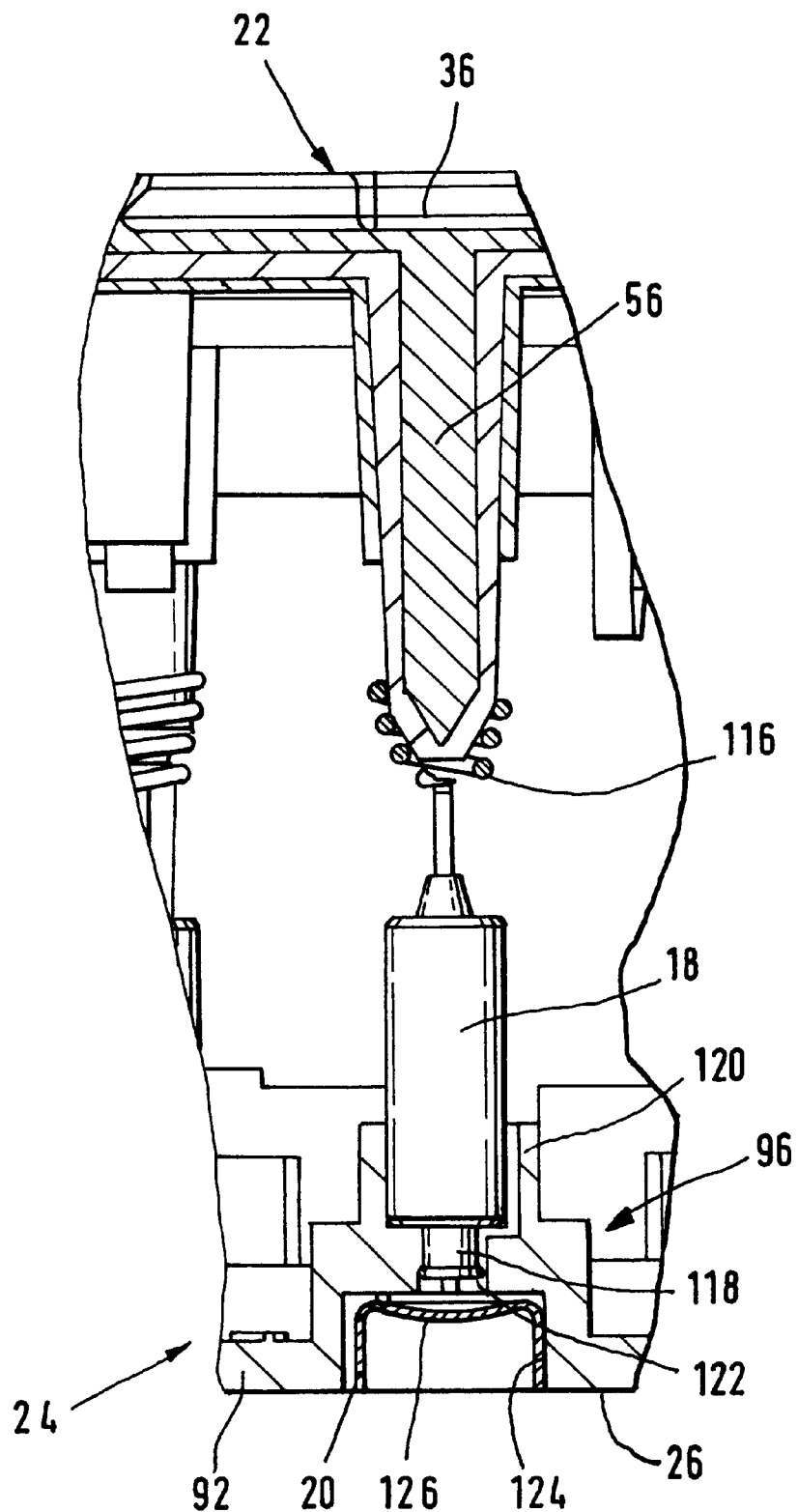
FIG. 6 is a cutaway front view of the apparatus in FIG. 1 in the direction of the arrow VI, in which a resistor is shown.

A resistor 18 is shown in FIG. 6 as it is arranged in the closed housing 12. The resistor 18 has a cylindrical body and a spring connector 116 on one end. The spring connector 116 circumscribes a conical outer surface. A conical protruding element 56 of the cover 22 presses in the spring connector 116. In this way the resistor 18 is fixed in position by the conical protruding element 56. The resistor 18 is at the same time reliably held in the receptacle 96. Also this arrangement provides some compensation for manufacturing tolerances. The resistor 18 has a contact 118 for the part group 14, in this case the switch 20, arranged outside of the housing on the other end. The resistor 18 is arranged, with the end on which the contract 118 is formed, in a sleeve-like extension 120 of the receptacle 96. The cylindrical contact 118 of the resistor 18 is arranged in a throughgoing passage 122 of the receptacle 96. The throughgoing passage 122 widens into a cylindrical depression 124 that extends from the assembly surface of the control block 24.

The switch 20 is arranged in the cylindrical depression 124, which means outside of the housing 12. The switch 20 is a pot-like part. The bottom 126 of the pot-like switch 20 is arranged on the contact 118 of the resistor 18 and arched away from it. If the oil pressure to which the switch is exposed increases, by a predetermined amount, for example 1 bar, the arched bottom 126 is pressed in the direction of the contact 118 of the resistor 18, until it finally contacts it. The resistor then feeds a signal to a control device because of that. The switch 20 is only secured by means of a press fit in the cylindrical depression 124.

As shown in FIG. 1 the cylindrical depression 124, the valve seats 94,95 and the receptacles 96, the receptacles for the part group 14, are formed in control block 24 so that the part group 14 can be arranged from two opposite sides of the cover 22, whereby an economical uniaxial assembly is possible.

Figure 7:
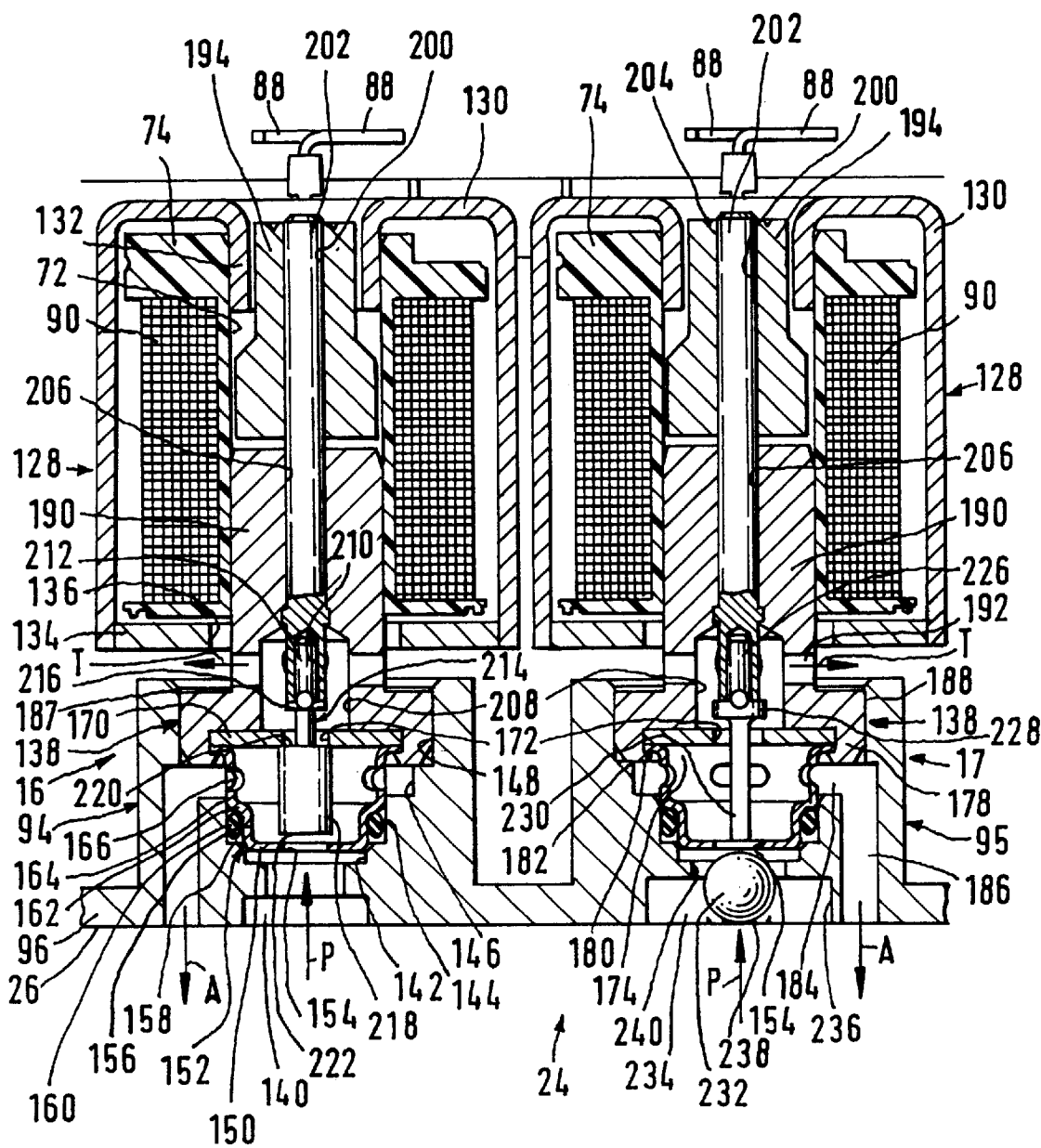
FIG. 7 is a cutaway front view of two electromagnetic valves according to the invention in the apparatus of FIG. 1 shown in the direction of the arrow VII in FIG. 1.

A first magnetic valve 16, which is open when no current is supplied to it, and a second magnetic valve 17, which is closed when no current is supplied to it, which have modified coil-part groups 128, are shown in FIG. 7. One coil-part group 128 has a magnetic casing 130, in which a coil body 74 with a winding 90 is arranged. The magnetic casing 130 has a casing passage 132, which engages in the passage 72 of the coil body 74, like the duct 89 of the flux plate 78 of the coil module 64, and fixes it in its radial position. A flux disk 134 provided with a central throughgoing hole 136 is attached to the magnetic casing. The coil-part groups 128 are similarly attachable via wire ends 88 to the protruding elements 58 of the cover 22 by means of the terminal cut connections.

The valve subassemblies 138 of the magnetic valves 16,17 are arranged in the respective valve seats 94,95. A stepped passage 140 is provided for the fluid flow from the inlet connection P of the magnetic valve 16 which is open when no current is supplied to it. This stepped passage 140 extends through the mounting surface 26 of the control plate 96 of the control block 24. The valve seat 94,95 is provided with a first, second, third and fourth passage step 142, 144, 146 and 148 in the stepped passage 140 having respective successively increasing diameters.

A base portion 150 of a valve cap 152 of the valve subassembly 138 is arranged in the first passage step 142. The base portion 150 of the valve cap 152 has a central hole 154, which is aligned with the stepped passage 140 extending through the control plate 92, which corresponds to the inlet connection P of the magnetic valve 16. A sleeve-like section 156 of the valve cap 152, which has the same diameter as the base portion 150, connects to the base portion 150. An O-ring 160 is arranged in a first annular space 158, which is formed by the sleeve-like section 156 and the second passage step 144, for sealing purposes. The annular gap 158 is closed by a disk-shaped shoulder 162 of the valve cap 152, which connects to the sleeve-like section 156, whereby the valve cap 152 has an increased diameter. Another sleeve-like section 164 whose outer diameter is approximately equal to the outer diameter of the shoulder 162 connects to the disk-shaped shoulder 162. Several throughgoing holes 166 are provided in this other sleeve-like section 164. A disk-shaped collar 168 is formed on the sleeve-like section 164. A seat disk 170 of the valve subassembly 138 that has the same outer diameter as the collar 168 bears on the disk-shaped collar 168. Further a central hole 172 is formed in the seat disk 170. The seat disk 170 and the disk-shaped collar 168 arranged on it are fixed in a cylindrical depression 174 of a first cylindrical section 176 of a pole piece 178 of the magnetic valve 16. The valve cap extends into the valve seat 94,95 from the cylindrical depression 174.

The disk-shaped collar 168 of the valve cap 152 fits in annular fashion on the outer edge 180 of the cylindrical depression 174 in the pole piece 180 which is formed to fix the seal disk 170 and the valve cap 152 in the pole piece 178. The disk-shaped opposing surface 182 of the first cylindrical section 176 partially contacts on the disk-shaped surfaces between the third passage step 146 and the fourth passage step 148. Thus the third passage step 146, the opposing surface 182 and the sleeve-like section 164 form a second annular space 184. The second annular space 184 corresponds to the consumer connection A of the magnetic valve 16. A passage 186 which opens into the second annular space 184 extends from the mounting surface 26 of the control block 24 and connects perpendicularly to the second annular space 184.

The outer diameter of the first cylindrical section 176 of the pole piece 178 corresponds approximately to the diameter of the fourth passage section 148 of the valve seat 94,95. This diameter is dimensioned so that the pole piece 178 is engaged in a press fit in the valve seat 94,95 or the diameter is dimensioned so that a seat is formed in which the edge 187 of the fourth passage section 148 fits in annular fashion around the first cylindrical section 176 to provide a form-locking connection of the pole piece 178. Thus the valve subassembly 138 is fixed in the control block 24 by means of a form-locking connection which is sealed by means of the O-ring. Additional attachment means, for example screws and attaching clips, are therefore unnecessary and are eliminated. The length of the first cylindrical section 176 is ideally dimensioned somewhat less than the depth of the fourth passage step 148.

A second cylindrical section 190 of reduced diameter connects to the first cylindrical section 176 of the pole piece 178. This second cylindrical section 190 extends into the passage 72 of the coil body 74, whereby a disk seat is provided. The second cylindrical section 190 and the annular surface around the fourth passage section 148 of the valve seat 94,95 are spaced so that an annular gap is formed. At least one transverse passage 192 is formed in the second cylindrical section 190 in the vicinity of this annular gap. This transverse passage 192 opens into the housing 12 and forms the return connection T of the magnetic valve 16. An opening is provided in the housing 12 at a suitable position, which connects with the filter plate 28. The position is selected so that the housing 12 is filled or approximately filled with pressurized medium in operation.

The armature 194 of the magnetic valve 16 connects to the second cylindrical section 190 of the pole piece 178 in the passage 72 of the coil body 74. In FIG. 7 a small gap, the so-called pole surface gap, is formed between pole piece 178 and the armature 194. The armature 194 has a first portion, whose outer diameter is somewhat less than the inner diameter of the passage 72. A second potion that extends into the protruding duct 132 of the magnetic casing 130 is connected to the first portion. The armature 194 has a passage 200 through which a pin or shaft 202 passes. A connection 204 is formed on the front end of the armature 194 so that the pin 202 is fixed in the armature 194.

The pin 202 extends through a first passage section 206 of the pole piece 178 and is longitudinally slidable in this first passage section 206. The pin 202 projects into a second passage section 208 of the pole piece 178. The second passage section 208 connects to the first passage section and is in the vicinity of the transverse passage 192. A cylindrical depression 174 in which the seat disk 170 is arranged connects to the end of the second passage section 208.

A blind hole 210 is formed in the end of the pin 202, which extends into the second passage section 208. A first cylindrical section 212 of a first pin insert 214 is arranged in the blind hole 210. A collar 216 is formed around the first cylindrical section 212 of the first pin insert 214. The collar 216 bears on the opposing end of the pin 202. The first pin insert 214 positions itself in the pin 202 because of that. The first pin insert 214 is securely connected with the pin 202 by connection of the collar 216. It is also possible to fix the first pin insert 214 by means of a press fit of the first cylindrical section 212.

The first cylindrical section 212 of the first pin insert 214, whose diameter is less than that of the central hole 172 through the seat disk 170, extends through the central hole 172 of the seat disk 170 and widens into a second cylindrical section 218. The diameter of the second cylindrical section 218 is larger than the diameter of the central hole 172 and central hole 154. An annular surface 220 formed by first cylindrical section 212 and by second cylindrical section 218 can bear in a sealing manner on the edge of the passage 172. The length of the second cylindrical section 218 is less than the depth of the valve cap 152 or the spacing between the base portion 150 of the valve cap 152 and the seat disk 170. When the annular surface 220 contacts on the seat disk 170, the central hole 154 of the valve cap 152 is open. In this way a connection for pressurized fluid exists between the inlet connection P of the magnetic valve 16 and the consumer connection A, which corresponds to the first position of the magnetic valve 16. The opposing surface 222 of the first pin insert 214 contacts in a sealing contact on the annular surface around the central hole 154 of the valve cap 152 by operation of the armature 194 and the pin 202. Because of that pressurized medium can flow from the consumer connector of the magnetic valve through the passage 172 of the seat disk 170 to the return connection T of the magnetic valve 16. The second cylindrical section 218 is dimensioned so that the central hole 172 in the seat disk 170 or the central hole of the valve cap 152 are alternately closed. The pin insert 214 is forced with its annular surface 220 against the central hole 172 of the seat disk 170 in the currentless state and with pressurized medium acting through the inlet connection P. For that reason the inlet connector P is connected with the consumer connection A. The pin insert 214 is arranged between the seat disk 170 and the valve cap 152 in such a way that the consumer connection A is alternately connectable to the inlet connection P and the retun connector T of the magnetic valve 16 by the seat disk 170, the valve cap 152 and the pin insert 214.

The magnetic valve 17 that is closed in the currentless state has essentially the same parts as the magnetic valve 16 which is open in the currentless state. It has a second pin insert 224, which differs from the first pin insert 214 of the magnetic valve 16. The second pin insert 224 has a first cylindrical section 226, which is likewise arranged in a blind hole 210 of the pin 202. A second cylindrical section 228 connects to the first cylindrical section 226. The second cylindrical section 228 bears on the opposing surface of the pin 202 and is connected there so that the second pin insert 224 is fixed with the pin 202. A connection of the pin 202 in a press fit with the pin insert 224 is however also possible. The diameter of the second cylindrical section 228 is larger than that of the central hole 172 of the seat disk 170. During an appropriate operation of the magnetic valve the central hole 172 of the seat disk 170 is closed by the arrangement of the second cylindrical section 228 in the passage 208 of the pole piece 178. In the currentless state and during suitable action of the pressurized medium through the consumer connection A the second cylindrical section 228 is released, whereby pressurized medium can flow from the consumer connection A to the return connector T.

A third cylindrical section 230 whose diameter is less than the diameter of the central hole 172 or the central hole 154 of the valve cap 152 connects to the second cylindrical section 228 and corresponds to the diameter of the first cylindrical section 226. A ball 232 which is arranged outside of the valve cap 152 acts on the opposing surface of the third cylindrical section 230 during operation of the magnetic valve 17, whereby pressurized medium can flow from the inlet connection P through the central hole 154 of the valve cap 152. The length of the second pin insert 224 is also dimensioned so that it can cooperate with the ball 232. When the magnetic valve 17 is in the currentless state and the pressurized medium flows in the ball 232 presses on the edge of the central hole 154 of the valve cap 152 and closes it. The consumer connection A and the return connector T of the magnetic valve 17 are however connected with each other. The pin insert 224 is arrranged between the seat disk 170 and the valve cap 152 so that the consumer connection A is alternately connectable with the inlet connector P and the return connection T of the magnetic valve 16 by the seat disk 170, the valve cap 152 and the pin insert 214.

The ball 232 is arranged in a stepped passage 234, which extends from the mounting surface 26. In the first section 236 of the stepped passage 234 three radially protruding elements 238 are provided, whereby the ball 232 is held in the stepped passage 234 (FIG. 5). A second section 240 of the stepped passage 234 provided with a smaller diameter is formed between the first section 236 and the first passage portion 142. This second section 240 guides the ball 234 radially somewhat during axial motion.

During assembly of the magnetic valve 16 that is open in the currentless state first the pin insert 214 is fixed in the pin 202. This fixing can occur by a connection or also by means of a press fit of the pin insert 214 in the pin 202. The seat disk 170 is placed in the pole piece 178 in the cylindrical depression 174. After that the pin 202 is fit in the passage 206. After that the valve cap 152 is placed on the seat disk 170 in the cylindrical depression 174. The seat disk 170 and the valve cap 152 are fixed in the pole piece 178 by connection with the edge 180 of the cylindrical depression. Finally the armature 194 is placed on the pin 202 and positioned so that the correct displacement is set. Finally the armature is fixed by a connection 204.

To assembly the valve subassembly 138 the O-ring is connected on the first edge 156 of the valve cap 152. This part group is then put in the valve seat 94,95. By connection with the edge 187 of the passage section or step 148 the valve subassembly 138 is subsequently fixed in position.

During assembly of the valve subassembly 138 of the magnetic valve 17 that is closed in the currentless state the pin 202 is first connected with the assembled pin insert 224 in the passage 206 of the pole piece 178. Next the seat disk 172 and the valve cap 152 are arranged and attached in the cylindrical depression. Next the ball 232 is placed in the protruding element 238 of the stepped passage 234. Then the valve subassembly 138 is connected together with the mounted O-ring 160 in the valve seat 95.

The magnetic valve 16 that is open in the currentless state and the magnetic valve that is closed in the currentless state differ only by a few simple rotary parts, whereby an economical structural housing system is produced in a simple manner. The seat disk 170 is punched or stamped and the valve cap 152 is similarly punched or stamped and subsequently deep-drawn. The magnetic valves 16,17 are ideal for use in a module 10. The inlet connection P and the consumer connection A are acted on through the passages 140, 186 and 234, which are formed in the control block 24. The return connection T leads to the interior of the housing 12. The magnetic valve 16,17 can thus be constructed in a simple manner. The assembly of the magnetic valves 16,17 in the module 10 requires no additional parts for assembly. The valve subassembly 138 is connected in the control block 24, whereby the seal between the return connection T and the consumer connector A is formed. An O-ring can thus be eliminated. By the separation of the valve subassembly 138 and the coil-part groups 64, 128, connections between both these groups can be eliminated. Also the coil-part groups 64,128 require no additional attachment means for the cover 22.

Iron particles cannot be forced between the pole piece 178 and the armature 194. The adjustable positioning of the pin 202 in the passage 206 of the pole piece 178 provides a sufficient seal on the one side. An electromagnetic field that acts as a magnetic filter is produced between the armature 194 and the passages or ducts 132 or 84 on the other side. Particles that collect between them usually do not cause damage.

The spacing between the pole piece 178 and the armature 194 that corresponds to the pole gap is not influenced by the pairing of the coil-part groups 64,128 in the magnetic valves 16,17. No subsequent displacement adjustments are required, which reduces assembly costs.

Preferably no springs are used in the magnetic valves 16,17, whereby their fail-safe-behavior is decisively improved. It is possible to produce the desired pressure level at the consumer connector A by frequency modulated control of the magnetic valve 16.

The use of the described casting methods and the use of the magnetic valves 16,17 in a module 10, especially an electrohydraulic gear unit controller, allows considerable cost reductions in making the individual parts and in assembly. The magnetic valves 16,17 especially allow an economical and variably structured housing system.

The disclosure in German Patent Application 198 42 334.9-12 of Jun. 16, 1998 is incorporated here by reference. This German Patent Application, at least in part, describes the invention described hereinabove and claimed in the claims appended herein in below and provides the basis for a claim of priority for the instant invention under 35 U.S.C. 119.

While the invention has been illustrated and described as embodied in a magnetic valve, especially for use in a module of an electrohydraulic gear unit controller, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A magnetic valve for an electrohydraulic gear unit controller, wherein said magnetic valve is arrangeable in a multipart housing (12) including a first housing part (24) and a second housing part (22) and said first housing part (24) is provided with a valve seat (94,95);

wherein said magnetic valve (16,17) is provided with a consumer connection (A), a return connection (T) and an inlet connection (P) and said magnetic valve (16,17) comprises a coil-part group (64,128) arrangeable in the multipart housing, a pole piece (178) having a first cylindrical section (176) provided with a cylindrical depression (174) and a valve subassembly (138) arrangeable in said valve seat (94,95) provided in the first housing part (24); and wherein said valve subassembly (138) includes a punched or stamped seat disk (170) and a punched or stamped and deep-drawn valve cap (152), said seat disk and said valve cap extending into the valve seat (94,95), and a pin insert (214,224) arranged between the seat disk and the valve cap so that the consumer connection (A) is alternately connectable with the inlet connection (P) or the return connection (T) by means of the seat disk (170), the valve cap (152) and the pin insert (214,224); and wherein the valve cap (152) has a collar (168), said collar (168) of the valve cap (152) and the seat disk (170) are arranged in the cylindrical depression (174), the valve cap (152) extends into the valve seat (94,95) and the cylindrical depression (174) has an edge (180) formed for attachment of the valve cap (152) and the seat disk (170).

2. The magnetic valve as defined in claim 1, wherein the coil-part group (46,128) has a coil body (74) provided with a passage (72), the pole piece (178) has a second cylindrical section (190) connected with the first cylindrical section (176), the second cylindrical section (190) is arranged in the passage (72) in the coil body, at least one transverse passage (192) corresponding to the return connection (T) is provided in the second cylindrical section (190), the at least one transverse passage (192) is connected with an elongated passage (206,208) formed in the pole piece (178); and further comprising a longitudinally slidable pin (202) arranged in said elongated passage (206,208) and an armature (194) attached to said longitudinally slidable pin (202) at one end thereof, said armature (194) being arranged in the passage (72) and the pin insert (214,224) being inserted in and connected to another end of the longitudinally slidable pin (202).

3. The magnetic valve as defined in claim 2, wherein said valve cap (152) includes a sleeve section (164) connected with said collar (168) of the valve cap (152), a second annular space (184) corresponding to the consumer connection (A) is formed by the sleeve section (164) together with the first cylindrical section (176) of the pole piece (178) and with another sleeve section (156) of the valve cap (152) spaced from the sleeve section (164) in the valve seat (94,95) and at least one passage (186) extends from a mounting surface (26) of the first housing part (24) and opens into the second annular space (184).

4. The magnetic valve as defined in claim 3, wherein said valve cap (152) has a shoulder (162) between said another sleeve section (156) and said sleeve section (164), said shoulder (162) and said another sleeve section (156) form a first annular space (158) together with a passage section (144) in a stepped passage (140) provided in the valve seat (94,95), an O-ring (160) is arranged in said first annular space (158), the valve cap (152) has a base portion (150) provided with a central hole (154), the base portion (150) is arranged in another passage section (142) of the stepped passage (140), and the stepped passage (140) is provided through the first housing part (24) and corresponds to the inlet connection (P).

5. The magnetic valve as defined in claim 4, wherein the pin insert (214) has a second cylindrical section (218) arranged between the seat disk (170) and the valve cap (152), the second cylindrical section (218) has a diameter greater than a diameter of the central hole (172) in the seat disk (170) and a diameter of the central hole (154) in the base portion (150) and a length shorter than a distance between the seat disk (170) and the base portion (150) of the valve cap (152), whereby the central hole (172) of the seat disk (170) or the central hole (154) are alternately closable, so that the valve is open without electrical current passing through said coil body.

6. The magnetic valve as defined in claim 4, wherein the pin insert (224) has a second cylindrical section (228) arranged between the seat disk (170) and at least one transverse passage (192) provided in the pole piece (178) and a third cylindrical section (230) arranged between the seat disk (170) and the valve cap (152), the third cylindrical section (230) has a diameter less than a diameter of the central hole (172) in the seat disk (170), a diameter of the central hole (154) in the base portion (150) and a diameter of said second cylindrical section (228) and the pin insert (224) has a length dimensioned so that said pin insert (224) cooperates with a ball (232) arranged outside said valve cap (152) so that the valve is closed without electrical current passing through said coil body.

7. The magnetic valve as defined in claim 1, wherein the valve subassembly (138) is fixed in the valve seat (94,95) in the first housing part (24) by means of a form fitting connection.

8. The magnetic valve as defined in claim 1, further comprising a pole piece (178) having a first cylindrical section (176) and wherein the valve seat (94,95) is provided with a stepped passage (140) comprising a first, second, third and fourth passage step (142, 144, 146, 148) and said fourth passage step (148) has an edge (187) shaped for providing a form-fitting connection around said first cylindrical section (176) of the pole piece (178).

9. The magnetic valve as defined in claim 1, wherein the coil-part group (64,128) is attached in the second housing part (22) by means of a form-locking connection.

10. The magnetic valve as defined in claim 1, wherein the second housing part (22) includes protruding elements (58) and the coil-part group (64,128) includes wire ends (88) connected to the respective protruding elements (58) by means of a terminal cut connection and the second housing part (22) has conductor strips (52) connected with the protruding elements (58), whereby the coil-part group is electrically and mechanically connected with said second housing part (22).

11. A module (10) for an electrohydraulic gear unit controller, said module (10) comprising a multipart housing (12) and a plurality of magnetic valves (16,17) arranged in said multipart housing (12);

wherein said multipart housing (12) includes a first housing part (24) and a second housing part (22) and said first housing part (24) is provided with a valve seat (94,95);

wherein each of said magnetic valves (16,17) is provided with a consumer connection (A), a return connection (T) and an inlet connection (P) and comprises a coil-part group (64,128) arranged in the multipart housing (12) and a valve subassembly (138) arranged in said valve seat (94,95) provided in the first housing part (24); and wherein said valve subassembly (138) has a punched or stamped and deep-drawn valve cap (152) and a punched or stamped seat disk (170), said seat disk and said valve cap extending into the valve seat (94,95), and a pin insert (214,224) arranged between the seat disk and the valve cap so that the consumer connection (A) is alternately connectable with the inlet connection (P) or the return connection (T) by the seat disk (170), the valve cap (152) and the pin insert (214,224); and wherein each of said magnetic valves comprises a pole piece (178) having a first cylindrical section (176) provided with a cylindrical depression (174), and wherein the valve cap (152) has a collar (168), said collar (168) of the valve cap (152) and the seat disk (170) are arranged in the cylindrical depression (174), the valve cap (152) extends into the valve seat (94,95) and the cylindrical depression (174) has an edge (180) formed for attachment of the valve cap (152) and the seat disk (170), so that the valve cap and the seat disk are fixed in said pole piece (178).

12. The module as defined in claim 11, wherein the coil-part group (46,128) has a coil body (74) provided with a passage (72), the pole piece (178) has a second cylindrical section (190) connected with the first cylindrical section (176), the second cylindrical section (190) is arranged in the passage (72) in the coil body, at least one transverse passage (192) corresponding to the return connection (T) is provided in the second cylindrical section (190), the at least one transverse passage (192) is connected with an elongated passage (206,208) formed in the pole piece (178), and wherein each of said magnetic valves includes a longitudinally slidable pin (202) arranged in said elongated passage (206,208) and an armature (194) attached to said longitudinally slidable pin (202), the armature (194) is arranged in the passage (72) and is attached at one end of the longitudinally slidable pin (202) and the pin insert (214,224) is inserted in and connected to another end of the longitudinally slidable pin (202) remote from the one end of the longitudinally slidable pin (202).

13. The module as defined in claim 12, wherein said valve cap (152) includes a sleeve section (164) connected with said collar (168) of the valve cap (152), a second annular space (184) corresponding to the consumer connection (A) is formed by the sleeve section (164) together with the first cylindrical section (176) of the pole piece (178) and with another sleeve section (156) of the valve cap (152) spaced from the sleeve section (164) in the valve seat (94,95) and at least one passage (186) extends from a mounting surface (26) of the first housing part (24) and opens into the second annular space (184).

14. The module as defined in claim 13, wherein said valve cap (152) has a shoulder (162) between said another sleeve section (156) and said sleeve section (164), said shoulder (162) and said another sleeve section (156) form a first annular space (158) together with a passage section (144) in a stepped passage (140) provided in the valve seat (94,95), an O-ring (160) is arranged in said first annular space (158), the valve cap (152) has a base portion (150) provided with a central hole (154), the base portion (150) is arranged in another passage section (142) of the stepped passage (140), and the stepped passage (140) is provided through the first housing part (24) and corresponds to the inlet connection (P).

* * * * *